INVENTORS
R. F. BREWER
J. A. HOSFORD
BY
*[signature]*
ATTORNEY

FIG 3

INVENTORS
R. F. BREWER
J. A. HOSFORD
BY
ATTORNEY

INVENTORS
R. F. BREWER
J. A. HOSFORD
BY
ATTORNEY

May 16, 1961 R. F. BREWER ET AL 2,984,046
APPARATUS FOR FABRICATING DRY REED SWITCHES
Filed May 2, 1955 10 Sheets-Sheet 7

FIG 10

INVENTORS
R. F. BREWER
J. A. HOSFORD
BY
*W.C. Parnell*
ATTORNEY

May 16, 1961 R. F. BREWER ET AL 2,984,046
APPARATUS FOR FABRICATING DRY REED SWITCHES
Filed May 2, 1955 10 Sheets-Sheet 8

INVENTORS
R. F. BREWER
J. A. HOSFORD
BY
*W. C. Parnell*
ATTORNEY

United States Patent Office 2,984,046
Patented May 16, 1961

2,984,046
APPARATUS FOR FABRICATING DRY REED SWITCHES

Robert F. Brewer and James A. Hosford, Bethlehem, Pa., assignors to Western Electric Company Incorporated, New York, N.Y., a corporation of New York Filed May 2, 1955, Ser. No. 505,172

17 Claims. (Cl. 49—1)

This invention relates to apparatus for fabricating switches and more particularly to apparatus for fabricating dry reed switches.

In general, dry reed switches comprise a pair of flexible reeds formed of suitable magnetic material disposed in opposing ends of a tubular envelope and sealed therein so that their inner ends will overlap. The overlapping ends of the reeds or electrodes are to provide cooperating contact surfaces and the envelope enclosing these surfaces is either hermetically sealed under vacuum or provided with a protective gas to prevent oxidation and/or other deterioration of the contact surfaces. The overlapping inner ends of the reeds provide an air gap between the cooperating contact surfaces which must be accurate if the switch is to function properly upon the application of a preselected magnetic field. This requirement is further emphasized by the need of obtaining parallel relationship between the contact surfaces rather than line contact resulting from out of parallel relationship and the need of obtaining these operating characteristics within close tolerances for groups of such switches.

Switches of this type have been fabricated in various ways but none of these has proven entirely satisfactory. One of the earlier techniques included mounting or welding the reeds to metal tubes, sealing these structures in the ends of envelopes and subsequently, through the aid of further mechanism, pressing the tubes closed and welding them during the operation of an associated exhausting means. This entailed more than one machine together with additional handling steps in the manufacturing method leaving opportunities for inaccuracies to occur and making it difficult to accomplish all of the fine requirements which are needed for the proper function of switches of this type. Furthermore, such methods of manufacture were not readily adaptable to mass production and for completion in a single machine.

The general object of this invention is an apparatus for efficiently and accurately fabricating switches of the dry reed type.

Broadly, the invention comprises an apparatus for fabricating a switch having electrodes sealed in an envelope, comprising means to seal exhaust and intake openings of the envelope in that order and means to flush gas through the envelope to surround the electrodes therewith while the exhaust and intake openings are sealed.

More specifically, the invention comprises a turret type apparatus with eighteen identical heads or units individually functioning to receive the parts for a switch and to complete the fabrication of each switch during each cycle of continuous operation of the machine. Each head includes a fixed position lower member with a chuck to receive and grip the bottom reed, a top member with a chuck to receive and grip the top reed and an intermediate member not only with a chuck to receive and grip the envelope but with heating elements normally spaced to avoid interference with the reception of the envelope by the chuck but movable with the intermediate and top members into their sealing positions when lowered relative to the lower member to initially position the reeds and envelope for assembly relative to a gas jet so that a suitable forming gas may be forced upwardly through the envelope at a given rate to completely surround the reeds or electrodes therewith prior to and during sealing of the exhaust opening of the envelope, means being provided to reduce the rate of flow of the gas subsequent to the sealing of the exhaust opening and during the sealing of the intake opening.

One of the features of the invention lies in the opening of the chuck for the upper reed while the upper reed is held by magnetic attraction to the lower reed and supported thereby to assure parallel relation of the reeds at their overlapping inner portions while the exhaust end of the envelope is sealed. Another feature of the invention is the means for setting the gap between the inner overlapping ends of the reeds to assure accurate positioning and like positioning of the reeds in all switches.

Furthermore, each of the eighteen heads is complete with its electrical control means for the heating elements, to seal the ends of the envelope, the timing means when they become effective, the operation of the valves for the gas feeding means and indicating lamps serving as visual signals regarding the functions of these features. These and other features are embodied in the invention including separate feeding means for each reed and the envelope and safety features rendering any head ineffective and out of service resulting from the failure to discharge a finished switch or the inclusion of a broken or massing glass envelope.

Other objects and advantages will be apparent from the following detailed description when considered in conjunction with the accompanying drawings, wherein.

Figure 1:
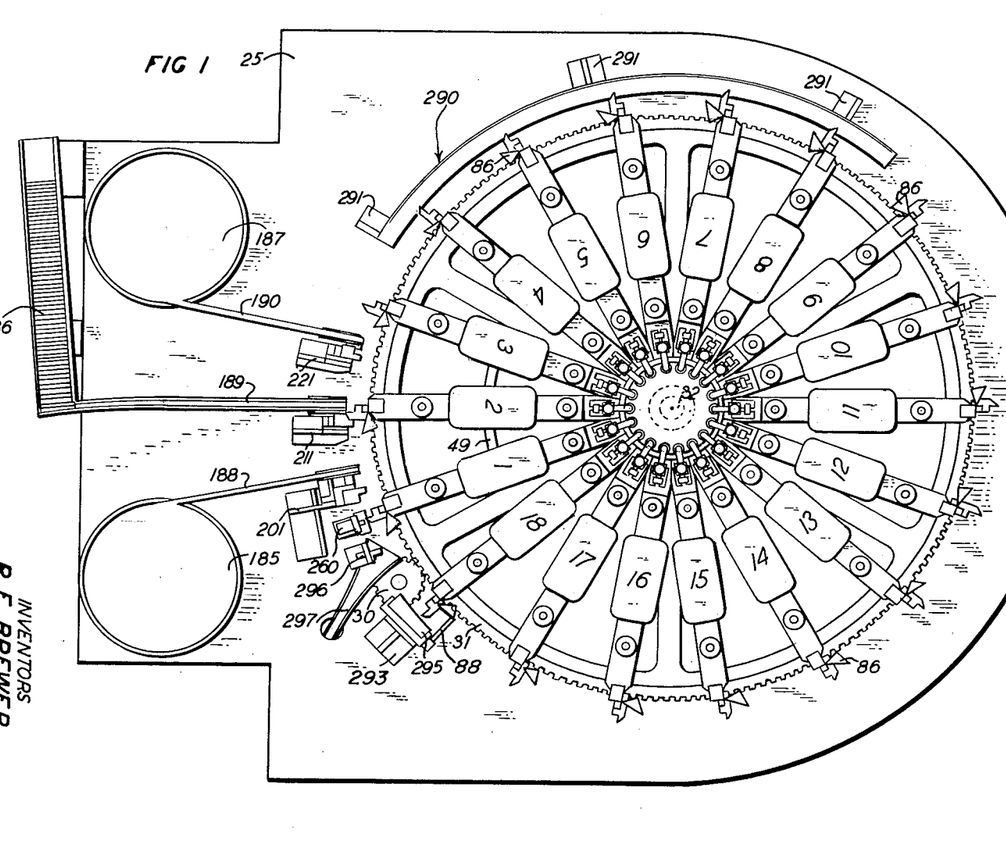
Fig. 1 is a top plan view of the apparatus.
Figure 2:
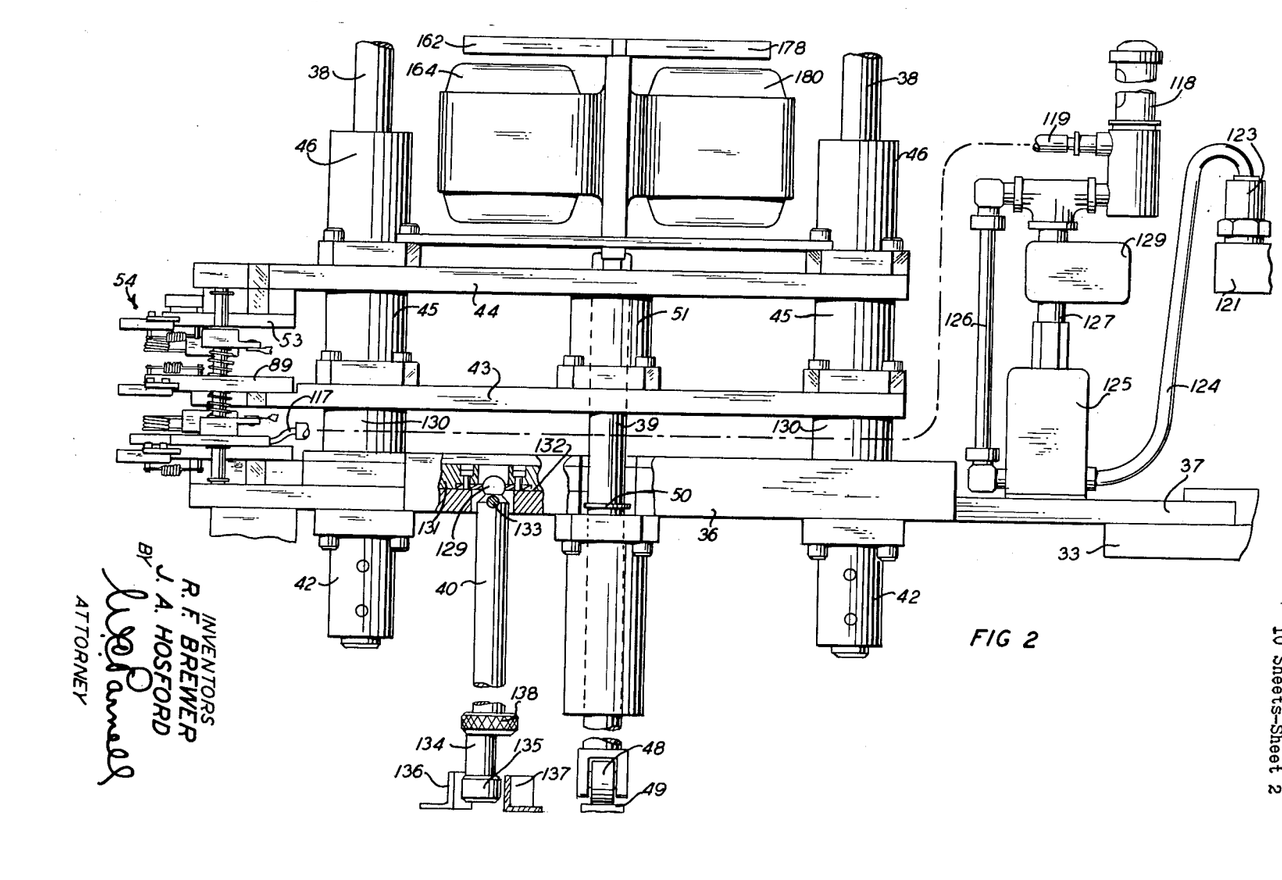
Fig. 2 is an enlarged side elevational view of one of the heads shown in closed position.
Figure 3:
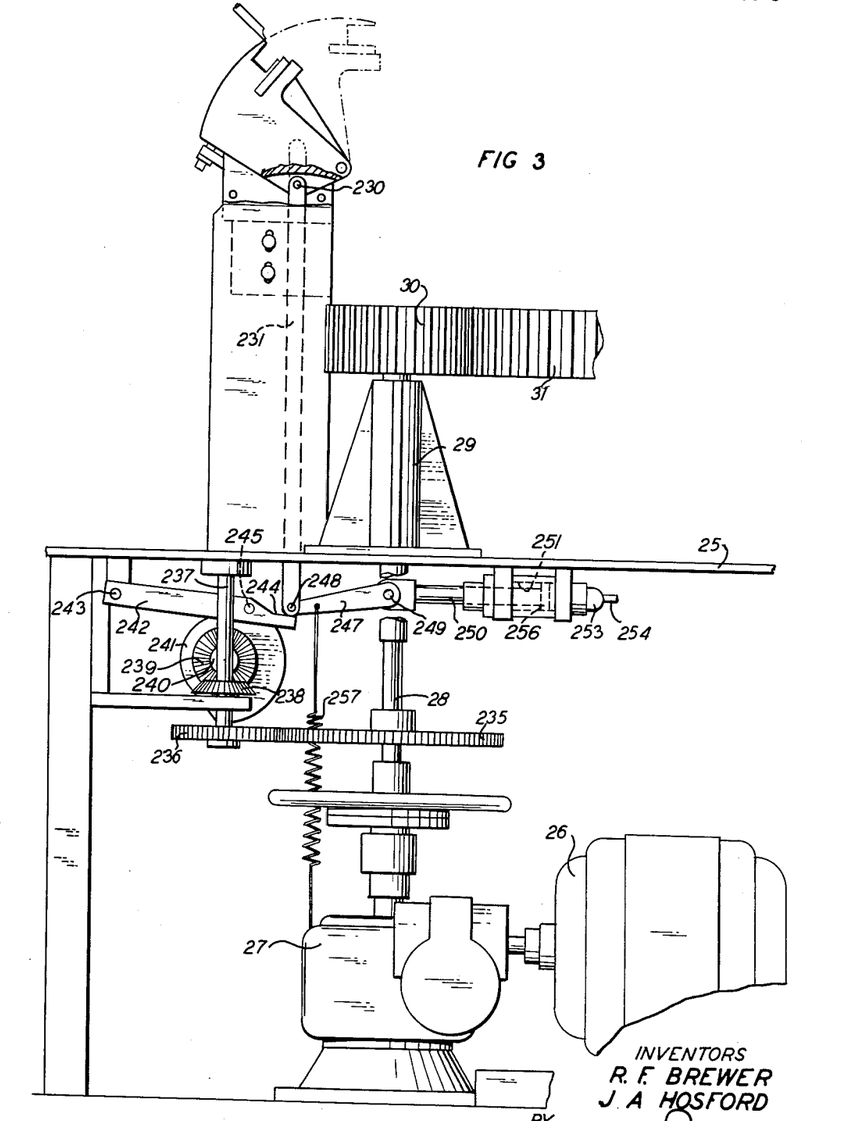
Fig. 3 is a fragmentary vertical sectional view of the apparatus showing the driving means and one of the feeding units.

Referring now to the drawings, attention is directed to Figs. 1, 2 and 3 which illustrate a housing 25 for the driving means and other control features of the apparatus. The main driving means includes a motor 26 which drives a speed reducing unit 27, the output shaft 28 of which extends vertically through the top of the housing and a bearing 29 supported thereby. A pinion 30 is fixedly mounted on the upper end of the shaft 28 and interengages a large gear 31 which is mounted for rotation on a vertical hollow shaft 32. An annular support 33 is fixed to the shaft 32 and formed to support the eighteen heads bearing numbers 1 to 18 inclusive, for the purpose of identification. The heads are identical in structure and a description of one will apply to each of the others.

The head shown in Fig. 2 includes a fixed position lower member 36 having its inner end 37 fixed to the annular support 33 and provided with spaced apertures for parallel guide rods 38, an elevating rod 39 and a gap aligning lever 40. The guide rods 38 have their lower ends fixedly mounted in bushing-like members 42 mounted on the undersurface of the lower member 36. The guide rods extend vertically through apertures in an intermediate member 43 and a top or upper member 44, these members being provided with bushings 45 and 46 respectively, mounted on their upper surfaces to receive the guide rods 38 and assure parallel spaced positions of the members 36, 43 and 44. The elevating rod 39 supports a cam roller 48 at its lower end positioned to ride upon a cam 49 formed to cause vertical movement of the rod 39 to open and close the head at predetermined positions during each operating cycle of the apparatus. A flange or shoulder portion 50 of the rod 39 is positioned to engage the undersurface of the intermediate member 43 at a predetermined interval during opening of the head to assure proper spacing of the members 36, 43, and 44. The rod 39 extends through a bushing 51, which is fixedly mounted on the upper surface of the intermediate member 43, and has its upper end fixed to the member 44 assuring upward movement of the upper member 44 during vertical movement of the rod 39 until the upper member is a given distance from the intermediate member, determined by the spacing of the shoulder which will raise the intermediate member a given distance from the lower member 36.

Figure 8:
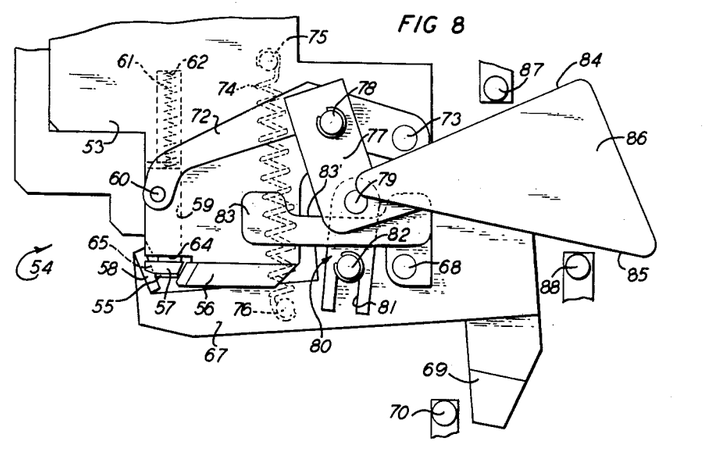
Fig. 8 is a top plan view of the chuck for the top electrode shown in closed position.
Figure 9:
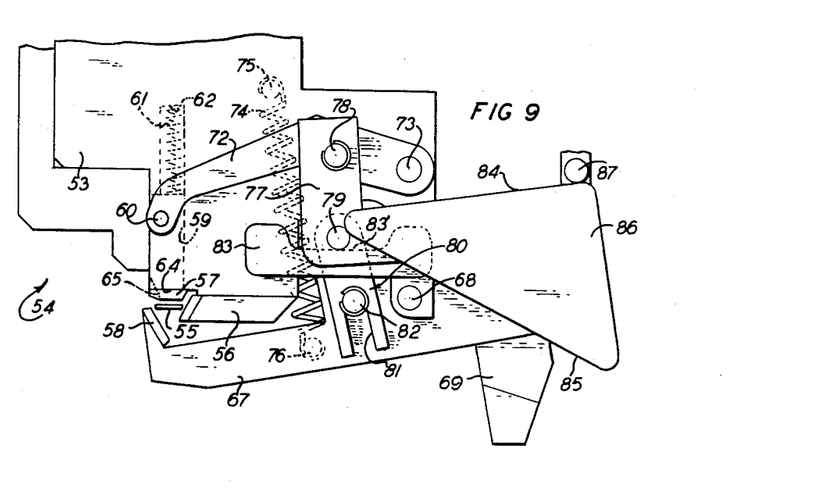
Fig. 9 is a top plan view of the chuck shown in Fig. 8 in open position.

The member 44 has an angularly shaped arm 53 mounted on its forward or left end (Fig. 2) constituting a part of an upper chuck 54 for the top reed or electrode 55 (Figs. 8 and 9). The chuck 54 has three members 56, 57 and 58 positioned with their electrode engaging surfaces in substantially triangular formation when in closed position as shown in Fig. 8, to firmly grip each top reed or electrode and position it accurately with respect to the envelope and bottom electrode. The member 56 is fixed to the arm 53 while the member 57 is movably disposed in a recess 59 of the arm 53, provided with a pin 60, extending vertically therefrom through a suitable elongate aperture (not shown) in the arm, and backed up by a spring 61 housed in a recess 62 of the arm to urge the member 57 toward its normal position. The electrode engaging portion of the member 57 is larger in cross-section than the remaining portion thereof, which is slidable in the recess 59, providing a shoulder to engage a surface 64 of the arm 53 to limit its movement away from the electrode engaging position. This portion of the member 57 is grooved diagonally at 65 to receive the member 58 when in closed or gripping position. A matching diagonal groove is formed in the arm 53 for the member 58.

The member 58 is a part of a lever 67, pivoted at 68 and carrying a finger 69 extending forwardly to engage a pin 70 mounted at a suitable fixed position in the path of each finger 69 to actuate the lever 67 and move the member 58 into a widely open position. This action may be single to include the ejection of the completed switch at the end of the operating cycle of the apparatus and to hold the chuck open to receive a new top electrode for the next operating cycle, or if desired, two pins 70 may be spaced to open the chuck twice; once, to eject the completed switch and again to receive the new top electrode.

A lever 72 pivotally supported at 73 adjacent one end on the arm 53 has its other end connected to the pin 60 of the member 57. A spring 74 expanded between a fixed pin 75, mounted on the arm 53, and a pin 76 mounted on the lever 67 serves to urge the lever normally into closed position. A cam lever 77 has one end pivotally connected at 78 to the lever 72 and an intermediate portion pivotally connected at 79 to one end of a saddle type lever 80. The lever 80 is bifurcated at 81 to straddle a pivot 82, mounted on the lever 67, permitting movement of the pivot 82 longitudinally of the lever 80 during rocking movement of the lever 67 into its wide open position and to allow the lever 80 to rock about the pivot. The closed position of the upper chuck shown in Fig. 8 shows the pivot 79 at the right of a dead center between pivots 78 and 82 causing the adjacent closed end of the lever 80 to rest against an adjacent surface of the arm 53. This connection between levers 67 and 72 may be actuated to cause partial opening of the chuck sufficient to free the top electrode when it is held magnetically by the bottom electrode during a given portion of each cycle of the apparatus. This partial opening and subsequent closing of the chuck is accomplished through surfaces 84 and 85 of a cam member 86 mounted on the lever 77 and positioned to be engaged respectively by stationary pins 87 and 88. These pins are shown adjacent the came surfaces in Figs. 8 and 9 solely for the purpose of illustration, it being understood that these pins are located in their proper positions about and above the gear 31, and mounted on the stationary housing 25, to actuate the successive upper chucks by engaging their respective cam surfaces 84 and 85. An element 83 fixed to the arm 53 has a surface 83' located free of the pivot 79 when the chuck is in the closed position, but located for the pivot 79 to ride on while the chuck is moved into the partially open position shown in Fig. 9. When the surface 84 engages the pin 87 the lever 77 will be actuated about its pivot 78, to move the pivot 79, on the surface 83' of element 83, to the left of the dead center of pivots 78 and 82 causing levers 72 and 67 to move outwardly away from each other, moving their respective members 57 and 58 relative to the fixed member 56 and the electrode 55 to free the electrode. This partially open position of the upper chuck will be held until the head, of which this chuck is a part, moves to a position near the end of its cycle where the surface 85 will engage the pin 88 (Fig. 1) to actuate the lever 77 to return the pivot 79 to the position shown in Fig. 8, allowing movement of the members 57 and 58 relative to the member 56 into closed and gripping positions.

The intermediate member 43 has a support 89 (Fig. 10) mounted on its outer end and machined with a diagonal surface in an area to receive a tubular envelope 91. Members 92 with V-shaped notches 93 are mounted above and below the surface 91 of the support 90 to straddle a lever 94, forming parts of the chuck for the glass envelope. The lever 94 is pivoted at 95 and normally urged into closed position by a spring 96 so that a laterally projecting end portion 97 will cooperate with the grooves 93 to grip the envelope and hold it with its centerline in a given position. A projection 98 of the lever 94 is positioned to be engaged by a pin 99 mounted at a fixed position near the start of the operating cycle of the apparatus to actuate the lever 94 about its pivot to effectively open the chuck to receive an envelope for the next switch.

The support 89 for the intermediate chuck, supports other units also, including an upper heating coil 101, a lower heating coil 102, a gas nozzle 103 and their associated structures. The upper heating coil 101 has its leads supported by insulating blocks 104 carried by a lateral member 105 which is apertured adjacent its ends to receive parallel rods 106. Suitable washers 107 are fixed to the upper ends of the rods 106 to limit the upward movement of the lateral member 105 which rests upon springs 108, they in turn resting upon the support 89. The rods 106 extend through apertures in the support 89 and have their lower ends mounted in blocks 110 to which a nozzle structure 111 is secured. Springs 112 disposed concentric with the rods 106 and interposed between the support 89 and the blocks 110 serve to space the lower part of the structure shown in Fig. 10 from the support. The lower heating coil 102 disposed with its centerline in alignment with the nozzle 103, the gripping area of the chuck and the centerline of the upper heating coil 101, has its leads 114 extending through dielectric blocks 115 mounted on the member 111. A passageway 116 in the member 111 connects the nozzle 103 to a gas line 117.

Figure 22:
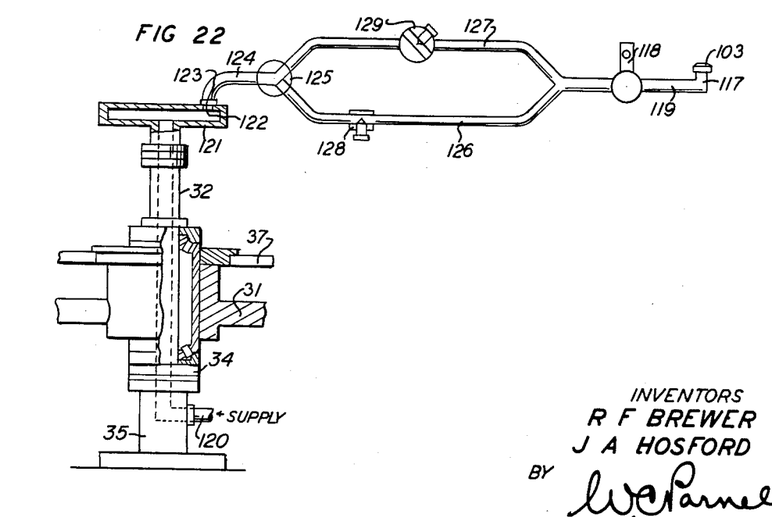
Fig. 22 is a schematic illustration of the gas control for each head.

Referring now to Figs. 2 and 22, the gas line 117 is shown connected to a ball type indicating unit 118, of a gas supply system, through a line 119, the major portion of which in Fig. 2 is represented by a broken line. The unit 118 registers variations in the pressure of gas leading to the nozzle 103. Considering both Figs. 2 and 22, it will be understood that the hollow shaft 32 for the apparatus is rotatably mounted on a suitable thrust bearing 34 of a stationary support 35 and provides a passageway for gas between a stationary gas supply 120 and a housing 121. The housing 125 is mounted on the upper end of the shaft and has eighteen outlets 122 adapted to removably receive connections 123 for the heads of the apparatus. The connection 123 shown in Fig. 22 is in a line 124 leading to a three-way solenoid valve 125. Two lines 126 and 127 lead from the three-way valve 125 through the indicator 118 to line 119. A suitable control valve 128 is disposed in line 126 to reduce the rate of flow of the gas through this line. A two-way solenoid valve 129 is disposed in line 127 and through the functions of the valves 125 and 129, gas under a predetermined rate may be fed to the nozzle 103 and from the nozzle vertically through the envelope 91 until the upper or exhaust opening of the envelope is sealed, after which the three-way valve may be actuated to direct the gas at a reduced rate through line 126 to the nozzle.

The lower member 36 carries bushings 130 for the guide rods 33 providing also seats for the intermediate member 43. A lower chuck support (Figs. 2 and 11) 131 is in the form of a slide resting in a groove 132 of the lower member 36 and held against lateral movement in the groove but adapted for longitudinal movement through actuation of the lever 40 to bring about setting of the gap between the electrodes in each switch. A ball and socket connection 129 between the lever 40 and the slide 131 effects longitudinal motion of the slide a small distance as compared to the distance the opposite or free end of the lever 40 is moved about a supporting pivot 133. The lower end of the lever 40 is composed of an eccentrically mounted portion 134 carrying a roller 135 at its lower end positioned to move between cams 136 and 137. The lower portion 134 is connected to the main portion of the lever through suitable threaded means 138 whereby the centerline of the roller 35 may be varied with respect to the centerline of the lever to bring about a high degree of adjustability in the gap setting means.

Figure 11:
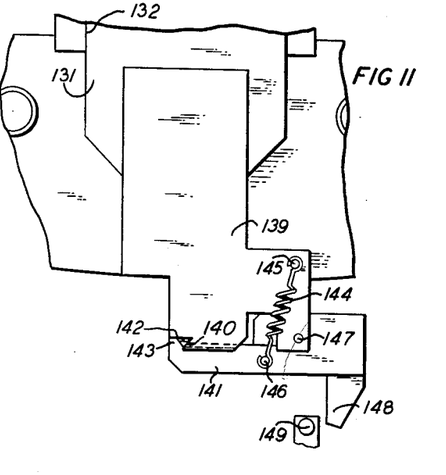
Fig. 11 is a fragmentary top plan view of the chuck for the bottom reed.
Figure 15:
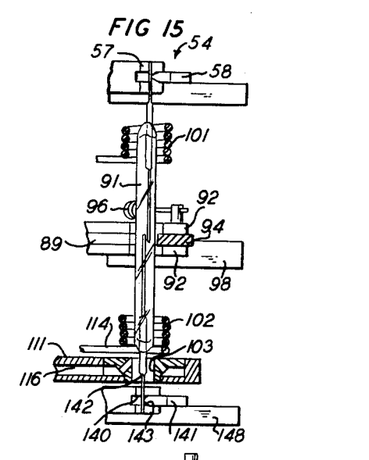
Fig. 15 is an enlarged and more detailed fragmentary vertical sectional view of the chucks, the gas jet, the heating coils and a completed switch, of a head in closed position.

The slide 131 has a member 139 fixed thereto, this member being of the contour shown in Fig. 11 and including a V-shaped groove 140 to receive the bottom reed or electrode 142 (Fig. 15). This portion of the support adjacent the groove 140 is bifurcated to receive a lever 141 and to provide surfaces of the groove 140 above and below the lever to cooperate with a portion 143 of the lever to grip and hold the lower electrode in place. A spring 144 positioned between a pin 145, mounted on the member 139, and a pin 146 mounted on the lever urges the lever clockwise about its pivot 147 into closed position. A projection 148 of the lever 142 is positioned to engage a pin 149 mounted at fixed position adjacent the feeding station for the bottom electrode so that the lever 42 will be moved into open position to receive a new bottom electrode.

Figure 21:
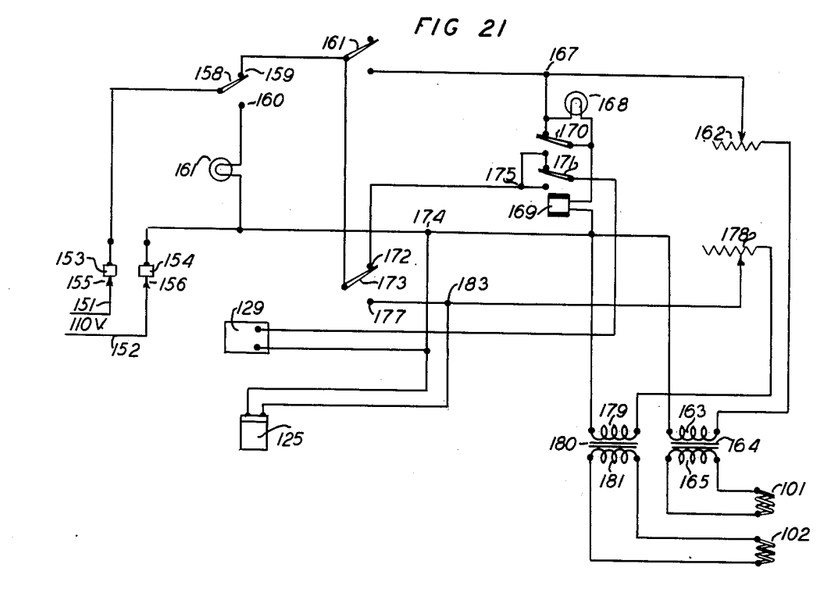
Fig. 21 is a schematic illustration of the electrical control for each head of the apparatus.

The schematic wiring diagram for each head is shown in Fig. 21. Suitable means may be provided to connect the eighteen individual groups of circuits for the heads to a stationary 110 volt supply represented by lines 151 and 152. In the present illustration, this means includes annular contact rings 153 and 154 supported in suitable dielectric material and disposed concentric with the shaft 32 to move with the shaft and the heads supported thereby. The connection between stationary supply lines 151 and 152 and their respective contact rings may be in the form of brushes 155 and 156. The group of circuits for each head includes a lockout switch 158 shown in its normal position but, under certain conditions, this switch will be actuated to lock its respective head out of operation and on such an occasion switch 158 will be moved from contact 159 to contact 160 completing a circuit through lamp 161 which indicates that this particular unit is out of operation. However, the normal operating position for the switch 158 is in engagement with contact 159 so that when a microswitch 161 is closed, certain circuits are completed, one through a rheostat 162 and a primary winding 163 of a transformer 164. The completion of this circuit energizes a secondary winding 165 of the transformer 164 to complete a circuit through the top heating coil 101. Another circuit is completed from connection 167 through lamp 168 and relay 169 causing energization of the relay to close its bottom contacts 170 and 171. Contact 171 will complete a circuit through switch 158, top contact 172 of switch 173, contact 171, through an electromagnetic valve 129 to connection 174. At the same time, a circuit is complete to lock in the relay 169 energized through switch 158, switch 173 and its top contact 172, through connection 175, contact bottom 170 and relay 169 back to contact ring 154. The last circuit locks the relay operated after opening of microswitch 161 to hold valve 129 operated to assure a continuous flow of gas through the jet 103 (Fig. 22) upwardly through the envelope 91. At a predetrmined interval of time, the microswitch 173 is actuated and moved away from its top contact 172 and into engagement with its bottom contact 177. This opens the circuit to the relay 169 and closes circuits through the bottom heating coil 102 and through the three-way solenoid valve 125. One circuit may be traced through switch 158, switch 173, its bottom contact 177, a rheostat 178, a primary winding 179 of a transformer 180 and back to contact ring 154. In this manner, the secondary winding 181 of the transformer 180 will energize the lower heating coil 102. Simultaneously with the closing of this circuit to the heating coil 102, a circuit is completed through switch 158, switch 173, its bottom contact 177, connection 183, three-way solenoid valve 125 and back through connection 174 to contact ring 154. This causes a continued flow of gas through the jet 103 but now at a reduced rate after the sealing of the top or exhaust opening of the envelope and during sealing of the intake or bottom opening thereof.

The feeding means for the parts including the top electrode 55, the envelope 91 and the bottom electrode 142 includes suitable units 185, 186 and 187 respectively, adapted to feed their respective parts end-to-end through chutes 188, 189 and 190. The details of the feeding means thus far are not claimed specifically as parts of this invention and for this reason they are not shown in detail. The means for feeding the parts for each switch singly from their respective chutes to the paths of their respective chucks of each head are shown respectively in Figs. 5, 6 and 7.

Figure 5:
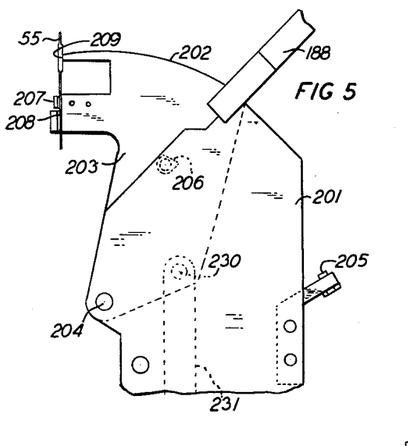
Fig. 5 is a side elevational view of a portion of the top electrode feeding unit.

In Fig. 5, the vertical support 201 is mounted on the housing 25 at a position adjacent which each head is to start its operating cycle by receiving a top reed or electrode 55. The chute 188 for the electrodes 55 is held closed by an arcuate surface 202 of a transfer arm 203 mounted on the pivot 204 carried by the support 201. A stop 205 mounted at a fixed position on the support 201 limits clockwise movement of the transfer arm 231 into its loading position so that the arcuate surface 202 moves beyond the path of the electrodes 55 in the tube 188 to allow the bottom-most electrode to move into the position where its lower end will engage and rest upon a stop 206 fixedly mounted on the support 201. A spring 207 carried by the arm 203 will hold lower and intermediate portions of the electrode against surfaces 208 and 209, leaving the upper portion of the electrode free to be engaged and gripped by the upper chuck shown in Figs. 8 and 9.

Figure 6:
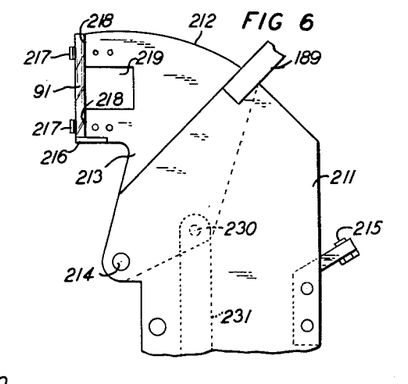
Fig. 6 is a fragmentary side elevational view of the envelope feeding unit.

The structure shown in Fig. 6 is similar to that shown in Fig. 5 in that a vertical support 211 has the lower end of the feeding tube 189 mounted thereon for the end-to-end feeding of the envelopes 91 singly thereto. The lower end of the chute 189 is closed by an arcuate surface 212 of a transfer arm 213 which is mounted upon a pivot 214 carried by the support 211. A stop 215 carried by the support 211 controls the loading position for the transfer arm so that when in engagement therewith, the bottom tube or envelope 91 may move out of the chute and into engagement with a stop or shelf 216 of the transfer arm 213. Resilient clips 217 are mounted on the ends of the bifurcated leading portion of the transfer arm 213 to hold the end portions of the envelope against surfaces 218 so that the chuck shown in Fig. 10 may cause its portions to move through the opening 219 and grip the envelope, removing it free of the spring clips and the transfer arm 213.

Figure 7:
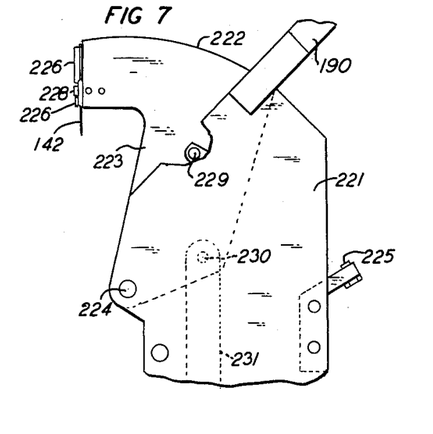
Fig. 7 is a fragmentary side elevational view of the bottom electrode feeding unit.

The structure shown in Fig. 7 is similar to those shown in the other Figures 5 and 6, including a vertical support 221 for the bottom or lower end of the chute 190 which is closed by an arcuate surface 222 of a transfer arm 223. The transfer arm 223 is mounted upon a pivot 224, carried by the support 221, and is limited in its movement into a loading position by a stop 225. The end of the transfer arm 223 includes side portions 226 providing surfaces against which portions of the lower contact 242 may rest to position each lower contact accurately for reception by the bottom chuck shown in Fig. 11. A spring clip 228 mounted on the transfer arm 223 receives and resiliently holds each bottom electrode 142 during movement from the loading position into that shown where the electrode is ready to be received by the bottom chuck. Suitable means such as a stop 229 carried by the support 221 may limit travel of the lowermost bottom electrode when the arcuate surface 222 moves beyond the open lower end of the chute 190.

The mechanisms for actuating the transfer arms 203, 213 and 223 are substantially identical in structure and a description of one mechanism will apply to all three. It will be noted that each transfer arm has a rod with its upper end connected to a pivot 230. For the purpose of illustration, the pivots are given identical numbers and for the same purpose, the rods may be identified as 231, although there are separate rods and separate pivots for each feeding unit.

Figure 4:
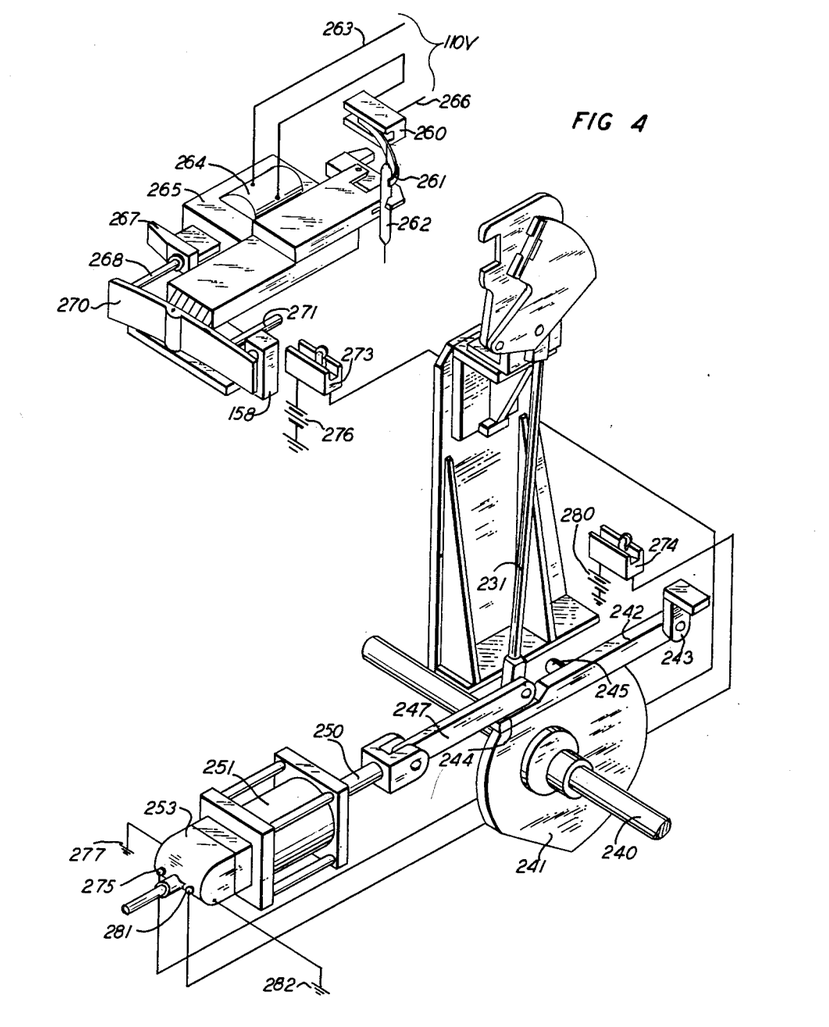
Fig. 4 is an isometric view of the envelope feeding means and control means associated therewith.

The actuating means for these mechanisms or feeding units originate with the main shaft 28 (Fig. 3) on which a gear 235 is mounted to drive a pinion 236 of a shaft 237. The shaft 237 is journalled in suitable bearings and has a bevelled gear 238 mounted thereon. The bevelled gear 238 interengages and drives a bevelled gear 239 mounted on a cam shaft 240 (Fig. 4). The cam shaft 240 has like cams 241 for the different feeding units shown in Figs. 5, 6 and 7, these cams differing mainly in the positions of their high and low portions on the cam shaft to cause actuation of their respective feeding units in predetermined order or sequence so that each head of the apparatus may be supplied successively with a top electrode 55, an envelope 91 and a bottom electrode 142. Each cam 241 has a follower 242 in the form of a lever having one end pivotally supported at 243, a reduced opposite end, providing a supporting surface 244, and a cam roller 245 disposed intermediate the ends to ride upon the surface of its respective cam 241.

A link 247 has one end connected to the rod 231 in each instance, as indicated at 248, the other end of the link being pivotally connected at 249 to a piston rod 250 of an air cylinder 251. A four-way solenoid valve 253 is of the double acting type controlling air under pressure from a supply line 254 to opposite sides of a piston 256 (Fig. 3) to control positioning of the lower end of the rod 231. As illustrated in both Figs. 3 and 4, the lower end of the rod 231 in each instance is resting upon the surface 244 of the cam follower 242 where it is held by a spring 257. While in this position during each cycle of each cam 241, its follower 244 will cause movement of its respective rod 231 to move its feeding unit, or the transfer arm 203, 213 or 223 connected thereto, from the loading position into the receiving position. However, should something occur to render the particular unit inoperative, means is provided to operate the valve 253 to actuate the piston 256 to the right (Fig. 3) to pull the associated rod 231 off the surface 244 so that subsequent actuation of the associated follower 242 by the cam 241, the feeding unit in each instance will not be actuated.

One instance in which this may occur may be the failure of a completed switch to be ejected from the apparatus. If this should occur, a microswitch 260 (Fig. 4) having its resilient finger 261 positioned in a path, to be engaged by a switch 262 failing to leave the apparatus, so that in this instance the switch 260 will be closed to complete a circuit from line 263, of a 110 volt supply, through a winding 264 of a solenoid 265 and through switch 260 to line 266. Energization of the winding 264 will cause actuation of the solenoid core 267 to move an adjacent pin 268 to rock a lever 270 and move a pin 271 inwardly while at the same time actuate lock-out switch 158 (Figs. 4 and 21) moving the switch 158 from its top contact 159 to its bottom contact 160. As heretofore described, this actuation of the lock-out switch 158 will complete a circuit through the indicating lamp 161 to indicate the lock-out condition of that particular head. This condition continues to exist holding that particular unit inactive until the cause of the trouble has been removed. The operator noticing the light 161 illuminated determines the cause of the trouble, manually removes switch or makes any other correction needed, after which time the head may be returned to its operating condition by manually actuating the lever 270 to withdraw the pin 271 from its controlling position in the path of switches 273 and 274 of each feeding unit, permitting the head to perform its operating function during the next cycle of operation of the apparatus. While the pin 271 is moved outwardly in the paths of the switches 273 and 274, it will prevent actuation of the feeding units shown in Figs. 5, 6 and 7, for this particular head, but will recondition the feeding units for the successive heads. This is brought about by the pin 271, of the particular head which is inactive, actuating switch 273 to complete a circuit from grounded battery 276 through switch 273, terminal 275 of the four-way solenoid valve 253 to ground 277. This will cause movement of the piston 256 in the cylinder 251 to the right (Fig. 3) rendering the actuating means ineffective in each unit as the pin actuates its respective switch 273 to move the rod 231 thereof free of its cam follower 242, whereby the associated spring 257 will hold the transfer arm in each instance in its loading position. As soon as the locked out head has moved beyond the receiving position for each feeding unit, the switch 274 for each unit will be actuated into closed position completing a circuit from grounded battery 280 through switch 274, terminal 281 of the four-way solenoid valve 253 to ground 282. The closing of this circuit will reconnect its respective feeding means, returning the lower end of the rod 231 thereof to rest upon the surface 244 of its cam follower 242.

Figures 17, 18:
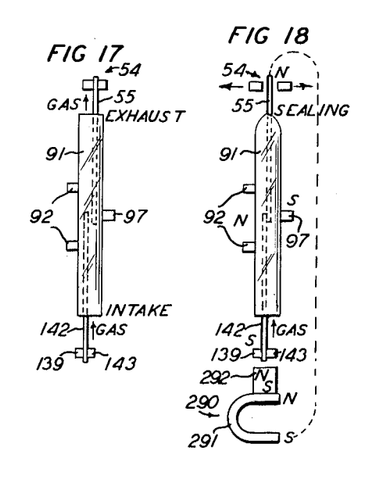
Fig. 17 illustrates the relative positions of the switch parts and the flow of the gas prior to sealing the exhaust or upper end of the envelope.
Fig. 18 schematically illustrates the magnetic means causing the gripped lower electrode to attract and support and released upper electrode prior to and during sealing of the exhaust end of the envelope.

A permanent magnet indicated generally at 290, has an arcuate shape to partially conform to the rotating structure shown in Fig. 1 and is mounted upon the housing 25. The magnet shown schematically in Fig. 18 includes a given number of permanent horseshoe magnets 291 joined by the arcuate portion 292. In Fig. 18, the letters N and S represent north and south poles respectively, illustrating the effect of the permanent magnet on the electrodes 142 and 55 so that when the heads 1 to 18 inclusive are in the area of the magnet 290, the overlapping inner ends of the electrodes will be attracted to each other when the upper chuck 54 is opened sufficiently to release the upper electrode 55 and allow it to be supported solely by the bottom electrode 142.

Near the end of the operating cycle for each head (see head 18 of Fig. 1) a bracket 293 mounted on the housing 25, supports the pin 88 and two parallel cam plates 295. The pin 88 is positioned to actuate the top chuck 54 through lever 77 from the open position shown in Fig. 9 to the closed position shown in Fig. 8, causing it to grip the top electrode and thereby support the completed switch until released by an ejector 296. The ejector 296 is positioned to engage the projection 69 of lever 67, moving the lever 67 to open the top chuck and allow the switch to drop down a chute 297. The parallel cam plates 295 respectively engage projections 98 and 148 of the center and lower chucks to move their levers 94 and 141 to open their chucks.

Figure 16:
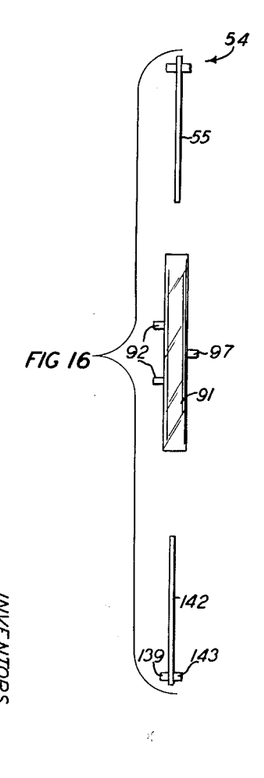
Fig. 16 is a schematic illustration of the upper and lower electrodes gripped in their chucks and the envelope gripped in its chuck prior to assembly.
Figure 19:
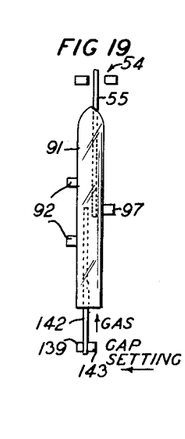
Fig. 19 schematically illustrates the setting of the gap between the overlapping ends of the electrodes by moving the lower chuck and lower electrode a given distance laterally.
Figure 20:
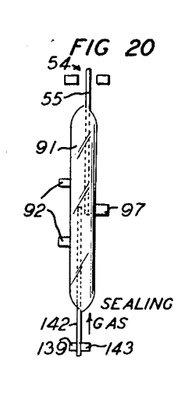
Fig. 20 illustrates the sealing of the intake opening of the envelope during continuous application of gas to the envelope.

Before considering the operation of the apparatus, it may be well to study Figs. 16, 17, 18, 19 and 20 in their respective order to determine what takes place regarding each of the eighteen heads during an operating cycle thereof. Fig. 16 illustrates the reception of the three parts for a switch when the head, receiving these parts, is in open position. There are only five main steps illustrated in these figures yet there are intermediate steps and proceeding steps which will be described more in detail. Fig. 17 schematically illustrates the relative positions of the electrodes and envelope when the head is in its closed or lowered position indicating the path of travel of the gas entering the lower or intake opening of the envelope and passing out of the upper or exhaust opening. In this manner, air is forced from the envelope and the envelope is continuously filled with gas until the switch is completed. Fig. 18 illustrates different steps particularly the continuous flow of gas, the attraction of the electrodes 55 and 142 while in the area of the magnet 290, the releasing of the upper electrode to assure parallel relationship between the inner flat surfaces of the overlapping areas of the electrodes and finally the sealing of the upper or exhaust end of the envelope 91 during the continuous flow of gas into the envelope. Fig. 19 illustrates the positive setting of the gap between the overlapping inner ends of the electrodes 55 and 142. The upper electrode remains free in its chuck 54 but is supported by the envelope in the middle chuck 92—97. Fig. 20 illustrates the continuous flow of gas into the envelope which has continued from the station illustrated in Fig. 17 prior to the top sealing of the envelope to and through the sealing of the lower or intake opening of the envelope.

Attention is next directed to Fig. 1 where it may be visualized that top electrodes 55 are fed from the supply 185 through chute 188 to the feeding unit shown in Fig. 5 while at the same time glass envelopes are fed singly from a supply 186 through a chute 189 to the feeding unit shown in Fig. 6 and bottom electrodes 142 are fed singly from a supply 187 through a chute 190 to the feeding unit shown in Fig. 7. It is suggested that attention be directed to the head number 1 which is passing by switch 260, shown in Fig. 4, which has a finger 261 disposed in the path of any switch which fails to be ejected by the unit 296 when in alignment with the chute 297. If the completed switch 262 should remain in the head 1, this head will be rendered inactive through the energization of the solenoid 264 (Fig. 4) causing core 267 to actuate pin 268, lever 270, pin 271 and switch 158. Switch 158 is the lock-out switch shown in Fig. 21 locking out the circuits to the gas control valves 125 and 129 and also the circuits to the heating coils 101 and 102. When the pin 271 is moved inwardly, it is disposed in the path of switches 273 of each feeding unit which may be identified in Fig. 1 by their brackets 201, 211 and 221. When switches 273 are closed, a circuit will be completed to energize the four-way valve 253 causing the position 256 (Fig. 3) with its piston rod 250 to pull the rod 231 free of the surface 244 of the cam follower 242 so that the cam 241 in each instance for each feeding unit may actuate its cam follower but not the other mechanism including the transfer arm of its respective feeding unit until head 1 is moved out of the feeding area where the operator may be notified by the illuminated lamp 161 (Fig. 21) and remove the cause by removing the completed switch which failed to be ejected. This occurs very infrequently but it is a safety feature necessary to prevent jamming and damage to the machine. The pin 271 will actuate each switch 274 for the feeding units to reset the feeding units for successive heads as soon as the locked out head passes.

Figure 10:
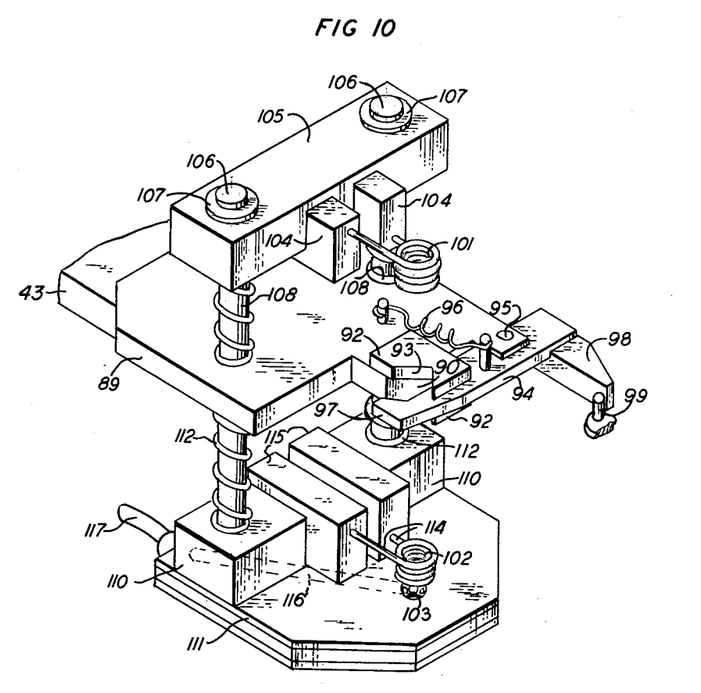
Fig. 10 is a fragmentary isometric view of the chuck for the envelope and the associated heating coils.
Figure 12:
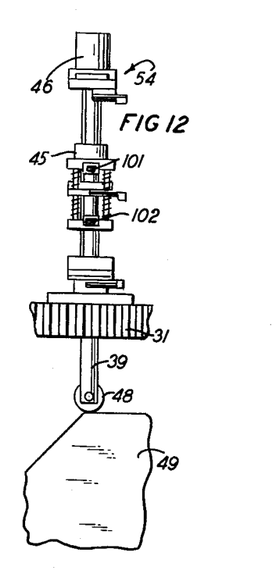
Figs. 12, 13 and 14 are somewhat schematic front elevational views of one of the heads, illustrating the open position in Fig. 12, the first closing movement in Fig. 13 and the final closing movement of the head in Fig. 14.
Figure 13:
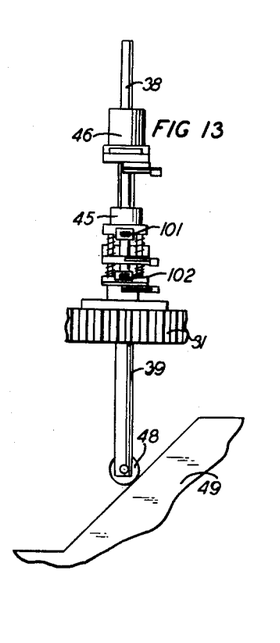
Figure 14:
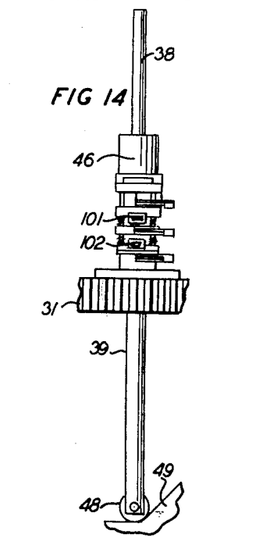

Returning to head 1 with the assumption that its completed switch during the previous cycle has been ejected, the head may, at this time, pass switch 260 without causing actuation thereof so that as it moves by the feeding unit for the top electrode (Fig. 5) the upper chuck (Figs. 8 and 9) will be opened to receive and closed to hold the top electrode. Continued clockwise movement will bring the number 1 head through the other two feeding stations where the glass envelope (Fig. 6) will be received by the intermediate chuck shown in Fig. 10 and the bottom reed or electrode (Fig. 7) will be received by the bottom chuck shown in Fig. 11. While the head moves past the feeding units it is in its open position, shown in Figs. 12 and 16, with the cam roller 48 riding upon the high portion of the cam 49. However, when the head reaches the area between the last feeding unit and the magnet 290, the cam roller 48 starts its ride down the inclined surface of the cam 49, beginning the closing of the head first (Fig. 13) by moving the intermediate member 43 and the upper member 44 at like spaced positions until the intermediate member comes to rest upon the bushings 130 (Fig. 2). This closing motion continues to the position shown in Figs. 2 and 14 where the upper member 44 rests upon the bushings 45. During this action, the lower electrode 142 remains, in a sense, at a fixed position while the other members are moved downwardly. In so doing, the structure shown in Fig. 10 carried by the intermediate member 43 lowers the nozzle 103 for the gas supply downwardly over the lower electrode together with the lower heating coil 102 and the glass envelope 91 so that the nozzle for the gas supply will be disposed closely adjacent the intake opening of the glass envelope. The structure shown in Fig. 10 is compressed to accomplish this purpose compressing the springs 108 and 112 to also locate the upper heating coil 101 about and adjacent the exhaust end of the glass envelope. Furthermore, the upper electrode carried by the top member 44 and its chuck 54 is lowered to a given position in the envelope so that the inner ends of the electrodes will overlap a given distance.

While the head under consideration continues its clockwise movement in the area of the magnet 290, the cam 86 of the lever 77 will engage the fixed position pin 87 causing rocking motion of the cam 77 with its action on the lever 80 to move the member 57 against the force of the spring into open position. At the same time the gripping portion 58 of the upper chuck is moved into its open position, freeing the top electrode which has, prior to this position, been attracted to the lower electrode 142 as shown in Fig. 18, bringing the flat surfaces of the electrodes into parallel engagement with each other. The microswitch 161 (Fig. 21) will be closed to complete circuits through the relay 169, the two-way valve 129 and the top heating coil 101. The slow action of the heating coil will give the gas supply means sufficient time after opening of the valve 129 (Fig. 22) to direct gas at a high rate through the nozzle 103 and the envelope 91 to clear the air from the envelope and cause continuous forcing of the gas upwardly through the envelope to exhaust and to maintain the envelope free of air during sealing of the exhaust opening of the envelope. After the upper or exhaust end of the envelope has been sealed, the unit has moved beyond the micro-switch 161 but due to the locking-in function of the contact 170, the relay 169 remains operated to continue the flow of gas into the envelope after the circuit is opened to the top heating coil, so that, when micro-switch 173 is actuated into engagement with its bottom contact 177, the flow of gas is continued, but at a lower rate due to energization of the electro-magnetic valve 125, and the bottom heating coil 102 is energized. This action takes place and remains effective for a predetermined time during which the lower or inlet end of the glass envelope is sealed. However, another and important step is interposed between the sealing of the exhaust end of the envelope and that of the intake end, this being the setting of the gap between the overlapping inner ends of the electrodes at a given position. The cam 86 of the upper chuck 54 is actuated by fixed position pin 88 to return the chuck to its closed position to grip the upper electrode as illustrated in Fig. 19 so that any desired arrangement of cams, as illustrated at 136 and 137 may actuate the lever 40 (Fig. 2), moving the slide 131, which supports the bottom chuck and bottom electrode, a given distance. The degree of actuation is variable through the adjusting means 138, but once the adjustment is made it remains fixed so that all switches produced by the apparatus will have like gaps between the inner overlapping ends of their electrodes. After the switch has been completed, suitable means, such as the pins or other means represented to actuate the chucks are positioned to open the bottom and intermediate chucks to release their portions of the completed switch, namely the bottom electrode and the envelope, so that the completed switch will be supported solely by the upper chuck. This takes place prior to the time the cam roller 48 of the head under consideration starts its upward travel to the high portion of the cam 49, moving the head into its open position before the completion of its operating cycle so that the finished switch may be demagnetized while passing by the unit 295 (Fig. 1) and ejected from the head by the unit 297 opening the top chuck allowing the finished switch to drop down the chute 297. At this time the head is ready to begin another cycle carrying out the necessary steps for fabricating its next switch to the final completion as illustrated in Fig. 15. Also, during each operating cycle of the apparatus seventeen other heads are independently performing like operations.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a continuously moving apparatus for automatically fabricating switches of two metallic parts and a tubular part held by feeding elements which are disposed in positions spaced vertically from each other, a head having three parallel horizontally positioned members identified as a bottom member, an intermediate member and a top member, a support holding the bottom member in a fabricating position and in a plane with its feeding element, a driving mechanism moving the support continuously horizontally, spacers interposed between the members to support the intermediate member in a fabricating position on the bottom member and to support the top member in a fabricating position on the intermediate member, an elevator fixed to the top member and extending downwardly through the other members of the head, a cam mounted adjacent the feeding element and having an inclined surface to move the elevator and the top member vertically to position the top member in a plane with its respective feeding element, a projection on the elevator engaging the intermediate member during vertical movement of the elevator to move the intermediate member into a plane with its respective feeding element, chucks mounted on adjacent ends of the members and having gripping jaws, and means to move the jaws of the chucks into open positions to receive their parts and to release the jaws to grip their respective parts and remove them from their feeding elements.

2. A continuously moving apparatus according to claim 1, in which the metallic members are of a length whereby their inner ends overlap in fabricated position and are gripped by the jaws of the chucks of the top and bottom members and held thereby so that they will extend into opposing top and bottom ends of the tubular part, gripped and held by the jaws of the chuck of the intermediate member, and have their inner ends overlapping each other in fabricated position, the cam having a declining surface to lower the elevator to lower the intermediate and top members into their fabricating positions on their spacers and assemble the parts, heating units energized to seal the respective ends of the tubular part about their respective metallic parts, and means to support the heating units adjacent their respective ends of the tubular part.

3. A continuously moving apparatus according to claim 2 in which the heating units are energizable heating coils, carriages holding the heating coils in alignment with each other and the chucks, means carried by the intermediate member to support the carriages for movement with the intermediate member and relative to the intermediate member into open and fabricating positions, springs carried by the intermediate member and normally urging the carriages into open positions and their heating coils free of engagement with the parts held by the feeding elements at the loading stations, and locating members mounted with respect to the carriages and the intermediate member to locate the carriages in their fabricating positions to position the heating coils concentric with their respective ends of the tubular part when the top and intermediate members are in their fabricating positions.

4. A continuously moving apparatus according to claim 3 in which an electrical circuit for each heating coil energizes each coil when closed, and means actuable during continuous movement of the head to close the circuits at different intervals of time to seal the top end of the tubular part about the metallic part therein and to subsequently seal the bottom end of the tubular part about the metallic part therein.

5. A continuously moving apparatus according to claim 4 in which cam means guides the chuck for the bottom member for movement relative to the bottom member between a normal position and a gap setting position, a gap setting means operatively connected to the chuck for the bottom member and means to move the gap setting means to move the bottom chuck relative to the other chucks after sealing of the metallic part in the top end of the tubular part to move the other metallic part from the sealed metallic part a given distance to set a gap of a predetermined distance between the overlapping ends of the metallic parts.

6. A continuously moving apparatus according to claim 5 in which a nozzle for a gas under pressure is supported by one of the carriages and positioned thereby in alignment with and adjacent to one end of the tubular part when the carriages are in their fabricating positions, and means carried by and movable with the head to force a gas through the nozzle and the tubular part under a predetermined pressure.

7. A continuously moving apparatus according to claim 6 in which a valve in a fluid line to the nozzle is operated after the top end of the tubular member is sealed to cause the gas to be forced through the nozzle and into the bottom end of the tubular part at a reduced pressure while the bottom end of the tubular part is sealed.

8. In a continuously moving apparatus for automatically fabricating switches of sets of three parts including two solid metallic parts of a length whereby their inner ends overlap in fabricated position and a tubular part held by feeding elements disposed in positions spaced vertically from each other, a support, a drive means rotating the support continuously about an axis relative to the feeding elements, a plurality of like heads spaced radially about the axis and each having three parallel horizontally positioned members identified as a bottom member, a top member and an intermediate member, means to secure inner ends of the bottom members to the support to locate the bottom members in fabricating positions, spacers interposed between the members of the heads supporting the intermediate members in fabricating positions on their bottom members and supporting the top members in fabricating positions on their intermediate members, an elevator supported for vertical movement in each head and fixed to the top member thereof, a cam mounted adjacent the feeding elements and having an inclined surface moving the elevator of each successive head approaching the feeding elements vertically to move the top member vertically into alignment with its part, a projection on the elevator of each head engaging the intermediate member thereof to move the intermediate member into alignment with its respective feeding element, chucks mounted on the outer ends of the three members of each head and having gripping jaws and means to move the jaws of each chuck into open positions to receive their parts and to release the jaws to grip their respective parts and remove them from their feeding elements.

9. A continuously moving apparatus according to claim 8 in which the cam has a declining surface to lower the elevator for each head, to lower the top and intermediate members thereof to their fabricating positions on their spacers to locate the metallic parts respectively in top and bottom ends of the tubular part with the inner ends of the metallic parts overlapping, a magnet mounted at a fixed position adjacent a path of the chucks for the intermediate members when the intermediate members are in their fabricating positions to cause the overlapping ends of the metallic parts to be drawn to and engage each other, and an actuating element mounted at a fixed position adjacent the magnet to open the jaws of the successive chucks of the top members to release top metallic parts so that they will be supported by their bottom metallic parts held by the chucks of the bottom members.

10. A continuously moving apparatus according to claim 9 in which top and bottom heating coils are positioned in each head for sealing the top and bottom ends of the tubular parts, a carriage for supporting each heating coil disposed in their respective heads, guides carried by each intermediate member to support their respective carriages for movement with and relative thereto and to cause the carriages to hold the heating coils in alignment with each other and the chucks, and means to apply forces to the carriages to move the carriages of each head away from the chuck of each intermediate member thereof and into paths which extend between the parts at the loading stations.

11. A continuously moving apparatus according to claim 10 in which separate means are mounted on the top and bottom members to cause relative movement of the carriages with respect to the intermediate member in each head to cause location of the top and bottom heating coils concentric with the top and bottom ends of their tubular parts, when members of each head are in their fabricating positions, an electrical circuit disposed in each head for each heating coil, and means in each head operable to close the circuits thereof at different intervals to energize their heating coils respectively to cause sealing the top end of the tubular part about the top metallic part and subsequently seal the bottom end of the tubular part about the bottom metallic part.

12. A continuously moving apparatus according to claim 11 in which an actuator for the chucks of the top members is mounted at a fixed position adjacent the path of said chucks and operates the jaws of the chucks successively to grip their top metallic parts when sealed in the top ends of their tubular parts, a guide for the chuck of each bottom member controlling movement of the chuck in a given path relative to the bottom member, a gap setter carried by the bottom member of each head and operatively connected to the chuck thereof, and means mounted at a fixed position with respect to the bottom members of the heads in a path of the gap setters to move the gap setters predetermined distances to impart like movements to the chucks of the bottom members to move the bottom metallic parts away from their top metallic parts to produce like gaps of a given distance between the overlapping ends of the metallic parts.

13. In a continuously moving apparatus for automatically fabricating switches of sets of three parts including a top metallic part, a bottom metallic part and a tubular part, the top and bottom metallic parts being of lengths whereby their inner ends overlap in fabricated position, and the parts being held by feeding elements disposed in positions spaced vertically from each other, a chuck for each part having jaws to grip its respective part and remove the part from its feeding element, an expansible and contractible head having three relatively movable supporting members, one for each chuck, means to mount the chucks on their supporting members, a support for the head, means to drive the support to move the head continuously relative to the feeding elements, means operable to expand the head to position the chucks to grip their parts at their feeding elements, means to cause the head to contract to cause the chucks to assemble the set of parts held by the chucks to position the top and bottom metallic parts in top and bottom ends of the tubular part in overlapping relationship, and means to seal the top and bottom ends of the tubular part respectively about the top and bottom metallic parts.

14. A continuously moving apparatus according to claim 13 in which the sealing means include an expansible and contractible heating unit mounted in the head and responsive to the expansion and contraction of the head, and top and bottom heating coils mounted in the heating unit, positioned free of the parts when the unit is expanded and positioned concentric with their respective top and bottom ends of the tubular part when the unit is contracted.

15. A continuously moving apparatus according to claim 14 in which a nozzle is supported by the heating unit in the head and movable therewith to a position adjacent the bottom end of the tubular part when the head is contracted, and means supported by the head to force a gas under pressure through the nozzle and into the tubular part.

16. A continuously moving apparatus according to claim 15 in which an electrical circuit is disposed in the head for each heating coil, switches disposed in the head for the circuits, and means to close the switches at different intervals to energize the top heating coil to seal the top end of the tubular part about the top metallic part and to subsequently seal the bottom end of the tubular part about the bottom metallic part.

17. A continuously moving apparatus according to claim 16 in which a valve is disposed in the gas forcing means, and means operated after the top heating coil is energized to operate the valve to cause reduction in the pressure of the gas forced into the bottom end of the tubular part.

References Cited in the file of this patent

UNITED STATES PATENTS

| | | |
|---|---|---|
| 1,019,457 | Graybill | Mar. 5, 1912 |
| 1,655,141 | Fagan et al. | Jan. 3, 1928 |
| 1,733,881 | Illingworth | Oct. 29, 1929 |
| 1,920,528 | Butler et al. | Aug. 1, 1933 |
| 2,152,793 | Donovan et al. | Apr. 4, 1939 |
| 2,273,439 | Freeman | Feb. 17, 1942 |
| 2,288,537 | Malloy | June 30, 1942 |
| 2,455,317 | Schneider | Nov. 30, 1948 |
| 2,523,903 | Ellwood | Sept. 26, 1950 |
| 2,531,008 | Stuart | Nov. 21, 1950 |
| 2,549,296 | Dilts | Apr. 17, 1951 |
| 2,637,144 | Gardner et al. | May 5, 1953 |
| 2,648,167 | Ellwood | Aug. 11, 1953 |
| 2,655,954 | Gartner et al | Oct. 20, 1953 |
| 2,675,647 | Roeber | Apr. 20, 1954 |
| 2,697,307 | Diehl et al. | Dec. 21, 1954 |
| 2,857,711 | Maurer | Oct. 28, 1958 |
| 2,882,648 | Hovgaard et al. | Apr. 21, 1959 |